US008102542B2

(12) United States Patent
Gagnon

(10) Patent No.: US 8,102,542 B2
(45) Date of Patent: Jan. 24, 2012

(54) METHOD AND APPARATUS FOR LAYER THICKNESS MEASUREMENT

(75) Inventor: Robert E. Gagnon, Mt. Pearl (CA)

(73) Assignee: National Research Council of Canada, Ottawa, Ont ( * ) Notice: Subject to any disclaimer, the term of this patent is extended or adjusted under 35 U.S.C. 154(b) by 309 days.

(21) Appl. No.: 12/379,608

(22) Filed: Feb. 25, 2009

(65) Prior Publication Data

US 2009/0222238 A1 Sep. 3, 2009

Related U.S. Application Data

(63) Continuation-in-part of application No. 11/529,389, filed on Sep. 29, 2006, now abandoned.

(60) Provisional application No. 60/721,996, filed on Sep. 30, 2005.

(51) Int. Cl.
*G01B 11/28* (2006.01)

(52) U.S. Cl. ........................................ 356/630; 356/625

(58) Field of Classification Search .......... 356/627–630, 356/625, 445–446, 128, 132–133, 369, 481, 356/482, 485, 486, 237.1–237.6; 250/340, 250/341, 200, 215, 216, 559.19, 559.01, 250/559.16, 229.28, 559.27; 244/134 R, 244/134 E; 340/962, 583, 580–581; 385/12
See application file for complete search history.

(56) References Cited

U.S. PATENT DOCUMENTS 4,808,824 A 2/1989 Sinnar
5,400,144 A 3/1995 Gagnon
5,650,610 A 7/1997 Gagnon
5,748,091 A * 5/1998 Kim .............................. 340/583
5,815,278 A 9/1998 Johnston et al.
5,921,501 A 7/1999 Pernick
6,717,671 B1 4/2004 Meeks et al.

OTHER PUBLICATIONS

Gregoris Dennis et al; Multispectral Imaging of Ice; CCECE; May 2004; Niagara Falls, Canada.
Office Action dated Nov. 26, 2008; U.S. Appl. No. 11/529,389.

* cited by examiner

*Primary Examiner* — Gregory J Toatley
*Assistant Examiner* — Tri T Ton
(74) *Attorney, Agent, or Firm* — Jason Davis

(57) ABSTRACT

A technique for optical measurement of a thickness of a layer on a surface uses diffuse reflections at opposite boundaries of the layer, operates on transparent, or translucent layers. The thickness is determined by computing a separation between the centers of the two diffuse reflections, and using the index of refraction of the layer, and geometric properties of a beam and detector with respect to the surface. The technique is useful for quantifying thickness of a layer of rime ice, glaze ice, frosted ice, or water, for example.

28 Claims, 4 Drawing Sheets pD
12
2
4
14
N
90-T
B
14'
S
16

18
Processor
8
6
aT
8b pV
pL
20
22
V
L
b
a
pD

METHOD AND APPARATUS FOR LAYER THICKNESS MEASUREMENT

CROSS-REFERENCE TO RELATED APPLICATIONS

This application is a continuation-in-part of U.S. patent application Ser. No. 11/529,389 filed Sep. 29, 2006 now abondoned and claims the benefit of U.S. provisional application Ser. No. 60/721,996 filed Sep. 30, 2005, the entire contents of both of which is hereby incorporated by reference as if fully set forth herein.

FIELD OF THE INVENTION

The present invention relates in general to non-destructive, remote detection and measurement of layers, and in particular relates to measurement of thickness of a layer of transparent or optically-diffusive, translucent material (e.g. rime ice) on a surface.

BACKGROUND OF THE INVENTION

In the context of cold weather aeronautics, it is necessary to provide an accurate assessment of whether a surface of an aircraft is bare, or covered with a layer of solid and/or liquid deposits such as ice and water, and to quantify the deposits so that an appropriate measure can be taken to ensure safe use of the aircraft. Typically this has been accomplished by visual or tactile inspections, however this is undesirable for numerous reasons, including gaining access to the surfaces (if the surface is moving, the area is dangerous, etc.), time and expense, etc. In other situations a like evaluation of surfaces on building structures, roadways, etc. is needed. Further in marine environments icing and its detection may pose particular problems given inclusions of brine in the ice, which make thickness of the layer difficult to quantify. It is frequently desirable to determine not only the presence but also the thickness of an ice layer.

A variety of techniques for transparent ice thickness measurement are known. Many known techniques use non-remote (i.e. contact) measurements, including techniques that embed emitters, sensors or other detection enabling devices on surfaces of aircraft. Electrical, acoustic, mechanical and optical devices have been proposed to date for non-remote measurement purposes. All contact type (non-remote) devices and certain optical devices have to be incorporated into or in close contact with, the surface on which the layer is to be detected, e.g. ice on an aircraft wing. The same holds true for their electrical connections that run from the sensor to the data logger. For this reason they are expensive to install and operate. Furthermore there are critical locations on structures, e.g. fuel tanks in wings, where embedded or manipulated sensors/emitters cannot, for practical reasons, be placed. Also, embedded devices generally give information for only the locations where they are placed on the structure (a few at most). Accordingly, there are considerable economic and practical benefits of remote (i.e. non-contact) techniques for ice thickness measurements.

One example of a remote system for ice detection known in the art is U.S. Pat. No. 5,921,501 to Pernick. Pernick teaches the scanning of a surface of an aircraft with a continuous wattage laser beam in a manner whereby the surface scatters the laser beam, the detecting of the laser light scattered by the surface, and the processing of the detected scattered laser light to reconstruct images of the surface, thereby indicating area of ice and water on the surface. The laser beam may have a first wavelength absorbed by either deicing fluid or water and ice and a second wavelength absorbed by the other of either deicing fluid or water and ice. Pernick's system requires separate handling of two signals to determine a composition of a layer. Furthermore absorption may not provide accurate enough an indication of thickness of the layer, in certain instances. Finally it does not appear that Pernick's system can be applied to measure or detect ice other than glaze ice. Accordingly rime ice or frosted glaze ice may not be detected or correctly measured using Pernick's system.

A device based on the degree of absorption of infrared radiation for detection and thickness measurement of ice is described in U.S. Pat. No. 4,808,824 to Sinnar. Sinnar teaches a system for detecting the formation of ice and/or water on a surface and measuring the thickness thereof. The ice detection and measurement system includes a radiation source for providing a discontinuous transmission alternating between a pair of narrow band infrared signals, each centered at a different, predetermined, discrete wavelength. The discontinuous alternating signal is applied to an optical system where it is divided into two beams for application to two respective detectors. A first reference detector includes a photoconductive cell for conversion of one of the two beams into a reference signal for each of the discrete wavelengths transmitted by beam. A second test detector includes a photoconductive cell for receipt of the other beam after transmission through the ice and/or moisture formed on the surface of an infrared transparent cover, for establishing a test signal responsive to infrared radiation absorbed at each of the two discrete wavelengths. The test and reference signals at each of the two discrete wavelengths are compared in microcomputer for detecting and measuring ice accumulation, to distinguish icing, frost and water accumulation, and to monitor progress of an icing/de-icing process.

The effectiveness of this technique would be compromised considerably by the effect of inclusions (air bubbles, grain boundaries etc.) in the ice that influence the intensity of radiation detected by the sensor. Furthermore the absorption qualities of water and ice are limitations on the wavelengths used for the system, and generally require more expensive sources.

MDA of British Columbia, Canada, has an optical system ("Ice-Cam") that uses spectral reflectivity to detect ice by its unique spectral signature. Unfortunately using a band of wavelengths in spectral reflection or absorption techniques requires more expensive transmission and detection equipment.

Applicant has previously developed a method and apparatus for remote detection and thickness measurement of ice or liquid layer (U.S. Pat. No. 5,400,144) using a laser and sensor (video camera or diode array). That method uses the laser to produce a certain pattern on the surface due to internal reflection of the light within the ice/liquid layer. The image can be processed to give the thickness of the layer. The technique is best suited to diffuse reflecting surfaces and optically clear layers with thicknesses from 500 μm to several centimeters, but can be calibrated for thinner layers. Applicant's previous method was not ideally suited for measurements of less transparent layers such as rime ice.

In a related field, non-contact optical devices have been developed for ice detection and measurement for road surface evaluation. Their range, i.e. distance of device from the surface, is fairly limited, and accordingly they are not applicable to aircraft ice detection and measurement, or for other distance measurements that are performed remotely.

There therefore remains a need for a system and apparatus for remote detection, and measurement of a layer on a surface, such as ice regardless of a degree of transparency of the layer.

SUMMARY OF THE INVENTION

In accordance with an aspect of the invention, a method is provided for optical detection, and thickness measurement, of a layer on a surface, the method comprising:

sending a focused beam of light onto a first spot on the surface whereby a substantial part of the beam is refracted for transmission through the layer if extant to illuminate a region on the surface;

detecting diffuse reflections from the first spot and the region on the surface, if the layer is extant;

computing centers of the detected first spot and the region to determine a separation between the centers; and computing a thickness of the layer using the separation, geometric properties of the beam, the surface, and detecting equipment, and an index of refraction of the layer.

The layer may be one of a liquid and a solid precipitate, such as ice.

The method may advantageously be used in remote configurations where the focused beam of light is projected by a laser at a distance from the surface, with conventional beam expander and focusing optics. Likewise the detecting equipment may be positioned a distance from the surface using, for example a telephoto lens.

The detection of diffuse reflections from the first spot and the region on the surface may be performed by a digital camera or diode array that feeds image data to an analyzer. In this case the analyzer may apply, for example, a blob analysis software to identify a center of the spot and the illumination, and to compute the separation.

The computation of the centers, if a plane defined by the detection equipment and beam is not normal to the surface at the first spot, involves computing a separation of the centers projected onto a line on an image that lies on the plane. Once the separation (S) is known, computing the thickness of the layer may involve solving for H (the thickness of the layer) using the following equation, or a simplification thereof:

$$H=S/(\sin(b)[\cos\{\tan^{-1}(\tan(b)\sin(T))\}\tan\{\sin^{-1}(\sin(V)/n)\}+\cos\{\tan^{-1}(\tan(a)\sin(T))\}\tan\{\sin^{-1}(\sin(L)/n)\}])$$

in which: V is an angle between a line of view of the detector and a normal to the surface; L is an angle of incidence of the beam; a is an angle in the plane of detection between the beam and the surface; b is an angle in the plane of detection between the line of view and the surface; and T is a tilt angle defined as ninety degrees minus an angle between the normal to the surface and a normal to the plane of detection.

The method may further be adapted to detect and measure thickness of the layer at multiple points on the surface, in which case a laser source for generating the beam, and the detection equipment may be equipped with pan and tilt equipment. In this case the apparatus may be configured by aligning tilt axes of the laser source and detection equipment. Coaxial tilt orientation (or other axis of rotation) guarantees that the line on the image corresponding to the plane, is invariant regardless of the tilt angle and pan angle of the laser source and the detector equipment. The method may therefore further comprise configuring involving orienting the tilt axes of the laser source.

Aligning the tilt axes may involve using scopes and/or lasers in a conventional manner.

It will be appreciated that if the method is applied to a surface on which there is no layer, no thickness is measured as there is the illuminated region is the spot. Accordingly, while the method is expected to be applied in situations where it is not known whether there is a layer on the surface, the method can be understood as a method for optical measurement of a thickness on a layer that is presumed to be extant.

In accordance with an aspect of the invention, an apparatus is provided for optical detection, and thickness measurement, of a layer on a surface, the apparatus comprising:

a laser source for producing a beam of light oriented to emit the beam onto a first spot on the surface, the laser source having a wavelength that permits a substantial part of the beam to be refracted for transmission through the layer if extant, to travel through the layer and illuminate a region on the surface;

detection equipment for sensing diffuse reflections from the first spot and the region on the surface, and outputting sensed data; and a data processor for computing centers of the detected first spot and the region to determine a separation between the centers, and for computing a thickness of the layer using the separation, an index of refraction of the layer, and geometric properties of the laser source, the surface, and detecting equipment.

The apparatus may further comprise a beam expander and focusing optics for focusing the beam at the surface which may be positioned remotely from the surface.

The detection equipment may comprise a digital camera or diode array for imaging the surface. If the surface is remote, a telephoto lens may be used to provide accurate imaging.

The data processor may be a general purpose computer that is communicatively coupled to the detection equipment. The general purpose computer may have blob analysis software for computing the centers of the detected first spot and the region on the surface. The region may be a second spot or a pattern of illumination caused by the beam's diffusion in transit through the layer. The software preferably determines a separation of the centers projected onto a line that corresponds to a plane of the beam and the detection equipment.

The laser source and detection equipment may be mounted on pan and tilt platforms. The platforms may be motorized for fine motion control. Preferably the tilt axes of the platforms are coaxial.

In accordance with another aspect of the invention a kit is provided that includes instructions for configuring a laser source and detector equipment with respect to a surface to detect a layer and measure its thickness if extant, using diffuse reflections at both top and bottom faces of the layer. The kit may further comprise program instructions for a processor for computing a thickness of the layer using a separation of centers of a detected first spot and an illuminated region when the laser source and detector equipment are configured with respect to a surface as described above, an index of refraction of the layer, and geometric properties of the laser source, the surface, and detecting equipment. The program instructions may further comprise program instructions for computing the centers of the detected first spot and the region to determine a separation between the centers.

The kit may further include the detector equipment, and a laser source suited to an application, and may further comprise controlled motion systems for panning and tilting the laser source and detection equipment. The kit may also include instructions and/or tools for configuring the laser source and detector equipment.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

The invention provides a technique for detecting a layer on a surface, and if extant, measuring its thickness. The technique is designed to measure ice on a surface, such as an aircraft wing, a road surface, a marine structure (if the layer is thin enough), or ice of various optical properties that form on an external fuel tank of the space shuttle, for example.

Figure 1:
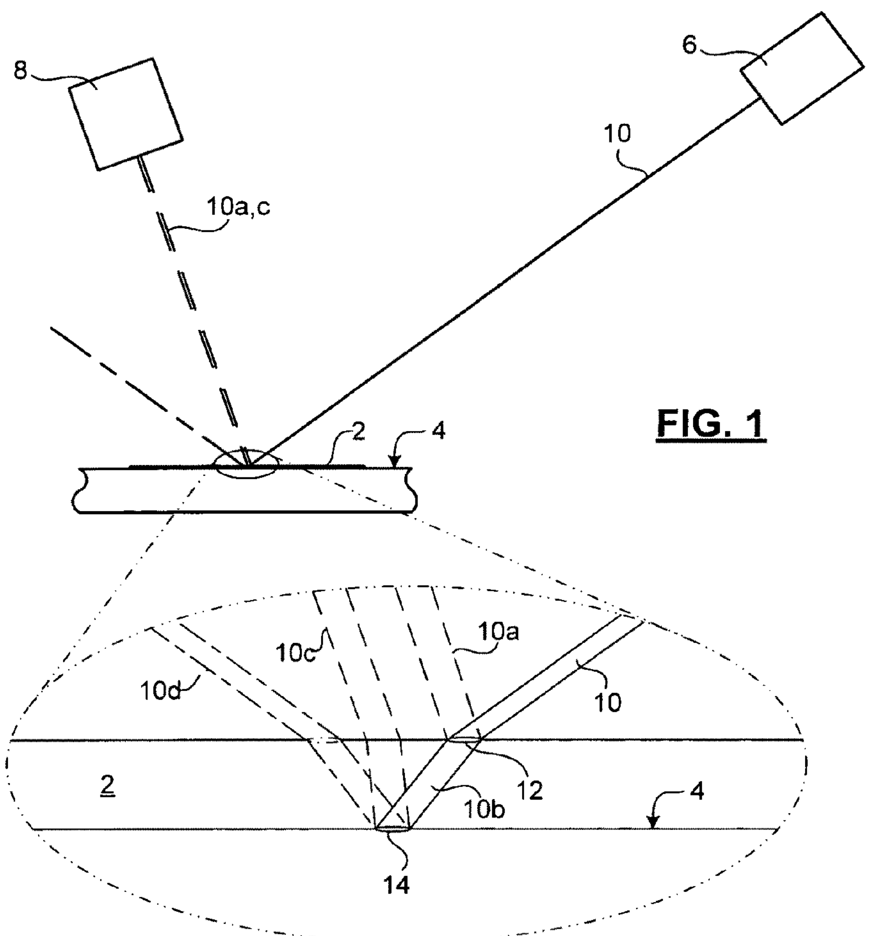
FIG. 1 is a schematic diagram illustrating an embodiment of the invention.
Figure 2:
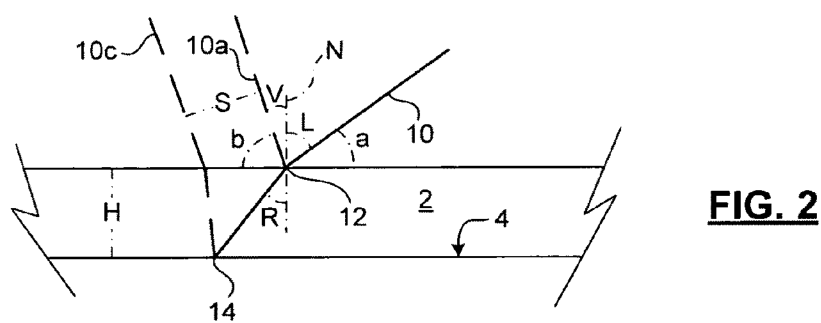
FIG. 2 is a schematic diagram showing geometrical parameters in a plane of detection for measuring thickness of a substantially transparent layer.
Figure 3:
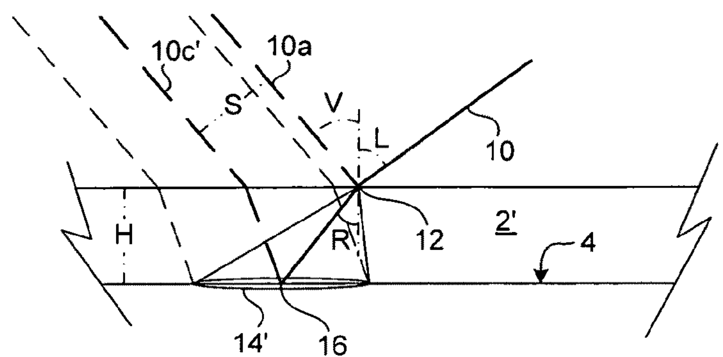
FIG. 3 is a schematic diagram showing geometrical parameters in a plane of detection for measuring thickness of a diffusive layer.

The detection technique of the invention is schematically illustrated in FIG. 1. FIGS. 2 and 3 illustrate geometrical parameters of the system, and illustrate operation of the detection technique in the case of both transparent and diffusing layers 2/2' on a surface 4. The apparatus for detection consists of a laser source 6, and a detector 8, such as a viewing apparatus. Advantageously the invention can be applied at distances requiring a telephoto lens or a telescope, for example, as a part of the viewing apparatus. Preferably the apparatus also includes a video camera, digital still camera, diode array, etc. that enables digital encoding of image data, and optionally signalling of the image data to an analyzer, although the method could be performed by a person viewing an image produced at the detector 8. In certain embodiments, the laser source 6 is also distant from the surface 4, and is equipped with optical focussing equipment that focuses light from the laser source 6 onto the surface 4 in a conventional manner. Both the laser source 6 and detector 8 are directed toward, and focused on, the surface 4. In some embodiments, it may be preferable to reduce background light by conventional filtering means at the detector 8, and a laser source 6 having a wavelength selected for ease of filtering may be preferred.

As is assumed for illustration of the invention, the surface 4 has a layer 2 of a transparent medium, such as glaze ice (see FIGS. 1,2), or a layer 2' of a translucent medium such as rime ice, or frosted glaze ice (see FIG. 3). Naturally, if there is no layer 2/2', there is only a single spot formed by the laser source 6 in view at the detector 8.

The technique for detection involves measuring a distance between manifestations of the light incident at boundaries between the air and the layer 2/2', and between the layer 2/2' and the surface 4. As is well known in the art, a small fraction of a beam of light having an intensity like that of a laser that meets an interface between optical media boundaries undergoes diffuse reflection, the bulk of the incident energy being reflected or refracted. The diffuse reflection sends the small fraction of incidence light in all directions. Accordingly, by relying on the diffuse reflection the present invention has the advantage of being logically independent of the position of the detector 8. The only position at which the detector 8 could not function is if it is substantially collinear with the laser source 6, but of course at this angle, one would occlude the other. In some orientations, the detector 8 will be aligned with a specular reflection of one of the top and bottom faces of the layer 2/2', and this may increase significantly an intensity of the detected light, e.g. depending on the properties of the surface 4. Accordingly the diffuse reflection may not be used in all cases, but the advantage of being able to use substantially any orientation of the detector 8 that faces the surface is provided by using the diffuse reflection.

Accordingly, the laser source 6 is configured to emit a focused beam of light 10 directed at the surface 4, at an angle of incidence L. The beam 10 may be monochromatic, and may have any wavelength that is transmitted by the detected layer 2/2'. For example, if ice is being detected, a laser in the visible or near UV spectrum could be used, to avoid the absorption that occurs in the infrared region of the electromagnetic spectrum.

If the layer 2 is transparent, as shown in FIGS. 1,2, the beam 10 first strikes a top face of the layer 2, where a substantial part of the beam 10 is refracted (i.e. beam 10*b*) for transmission through the layer 2. A second part of the beam 10 (not shown) is reflected off of the top surface at an angle equal to L (i.e. specularly), but this light is not used in the illustrated embodiment. A small fraction of the energy at the first spot 12 is diffusely reflected and radiates in all directions (diffuse beam 10*a*). The refracted beam 10*b* (angle R) passes through the layer 2 according to Snell's law at an angle R that depends only on the index of refraction (n) of the layer 2, and L, to illuminate the surface 4. In the present embodiment this illumination takes the form of a second spot 14. The second spot 14 on the surface 4 also reflects diffusely a fraction of the refracted beam 10*b* (including reflected beam 10*c* that is oriented to travel toward detector 8).

Depending on the optical properties of the surface 4, a major part of the light impinging on it may be absorbed, or the refracted beam 10*b* may substantially undergo specular reflection as specular beam 10*d*, which also plays no part in the present embodiment. However it will be noted that if beam 10*d* is relatively strong, (i.e. surface 4 is specularly reflective) then the intensity of the reflected beam 10*c* may be comparable to the intensity of the incident beam 10, and accordingly at the top face of the layer 2, a third spot is defined where diffuse reflection would again occur. It will be appreciated by those of skill in the art that any two of these three spots could be used to determine a thickness of the layer 2. However, the third spot is only clearly defined if surface 4 is a specular reflector, and the layer 2 is substantially transparent. For this reason, the third spot is not used in general deployments of the invention.

The detector 8 is oriented so that its field of view includes both the first and second spots, as reflected diffusely from the top and bottom faces of the layer 2. By selection of the orientation of the detector 8 greater angles between the laser source 6, first spot 12, and detector 8 are preferred in order to separate the first and second spots, as much as possible, subject to other constraints on the system. Distinctiveness of the spots, and corresponding accuracy of the measurements are enhanced if the incident laser beam is focused onto a small diameter on the surface 4 (e.g. <1 mm). The beam 10 can be focused to this diameter using a beam expander and focusing optics, as required for the desired distance between the laser source 6 and the surface 4. Beam expanders and focusing optics are well known in the art. The laser source 6 and detector 8 can be large distances (e.g. 150 feet) from the surface 2, the only limitations being on ease of spatial configuration of the equipment, and coordination of motions.

In FIGS. 1,2 the apparatus measures thickness of a transparent layer. In the case of an optically diffuse layer 2' of material, such as rime ice, or of a clear layer that has a surface that scatters light, such as glaze ice with a frosted surface, the first spot 12 will be visible on the top of the layer 2', as before, but the refracted beam 10*b* will produce a relatively large elliptical illumination 14' on the bottom of the layer 2' as shown in FIG. 3. The widening of the refracted beam 10*b* results from the diffusion through the layer 2', caused by, for example, many tiny air bubbles in the case of rime ice, and/or a frosted top surface of clear ice, and/or inclusions of air-filled voids and brine channels in marine ice. While dimensions of the illumination 14' will vary with properties of the layer 2', for layers 2' of thickness less than a limit (that depends on the layer 2'), a center 16 of the illumination 14' will still correspond to the point where the second spot would have appeared if the layer had been transparent, and therefore permits measurement of S.

The center 16 of the illumination 14' can be determined using commercially available blob analysis software, or manually. Once the center 16, and position of the first spot 12 are known, a separation S between the two is computed using a scale of the detector 8. The scale may be produced by a range finder, or by prior knowledge of a distance between the first spot 12 and the detector 8. Applicant has found that an accurate measurement of a focus setting on a telescope can be used as a range finder, when the detector 8 includes the telescope attached to a digital camera. It will be appreciated that the separation S may be the measured distance between the spot and the center, if the apparatus are subjected to particular spatial constraints explained below. Alternatively, either the first spot or the center of illumination (spot 14 or ellipse 14') is projected onto a line in a plane of detection defined below, and the separation between the projected point and the other of the spot and the center of illumination may be used to define the separation. Equivalently, the cosine of an angle from the plane of detection can be used to correct the perceived separation. Other methods of computing the plane of detection can be used, as geometries of particular applications may suggest.

Blob analysis software, or other image analysis tools may be used to compute a subpixel center of the spots, and to fit image data to an ellipse, in a manner well known in the art. Once the separation S is known, positions and orientations of the surface 4, laser source 6, and detector 8 can be used to determine the thickness H of the layer 2/2'.

It should be noted that FIGS. 1-3 are all projected images in detection plane $p_D$ defined by the laser source 6, first spot 12, and detector 8. Accordingly the illusion that N, a normal of the surface at first spot 12, from which L, V and R are defined, is in the same plane as angles a and b. This need not be the case as more clearly illustrated in FIGS. 4, 6.

Figure 4:
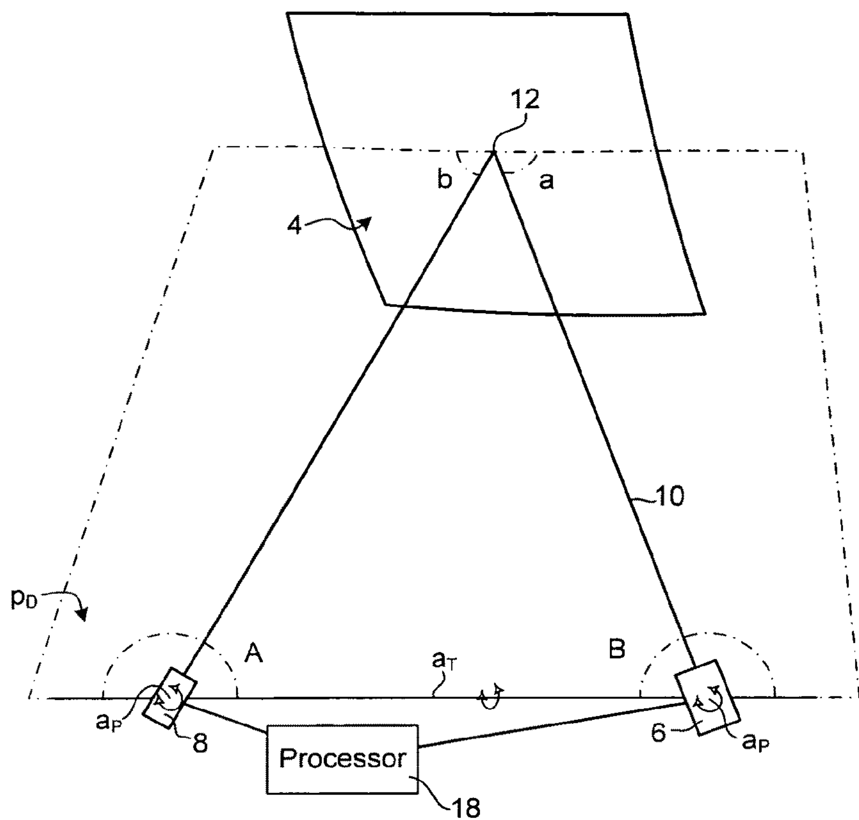
FIG. 4 is a schematic diagram illustrating an embodiment with an additional equipment for determining angles for computing the thickness.

In some applications the positions and orientations of the surface 4, laser source 6, and detector 8 are not known to within an accuracy desired for the measurement. FIG. 4 schematically illustrates an embodiment of the invention that provides for ready determination of relevant geometrical properties of the detection apparatus, as is particularly valuable in embodiments that measure and detect the layer 2/2' at a number of points on the surface 4, and thus require movement to scan the surface 4. As emphasized in FIG. 4, a plane of detection $p_D$, intersects the surface at the first spot 12, and includes the beam 10, a line of view of the detector 8, and an axis $a_T$ about which both the laser source 6, and detector 8 tilt. By alignment of the tilt axes of the laser source 6 and detector 8, one degree of freedom of the apparatus is removed, and still the laser source 6 is free to direct the beam 10 onto any point on the surface 4, and the detector 8 is free to follow the point, but an X axis of the image produced at the detector 8 will always be in $p_D$, facilitating the measurement of S.

As shown in FIG. 4, angles A and B are defined as pan angles of the detector 8 and laser source 6 respectively, with respect to $a_T$. Assuming that the surface 4 about the first spot 12 is planar, within $p_D$, the surface 4 at first spot 12 makes an angle a with respect to the beam 10, and an angle b with respect to the line of view of the detector 8. Angles A and B are related to angles a and b by the geometric equation (a+b)=(A+B). A and B may be read, or, as shown in FIG. 4, a processor for controlling tilt and pan of the laser source 6 and detector 8 may determine these angles directly, for example using a configuration table. The processor 18 may execute program instructions for analyzing image data from the detector 8, coordinate pan and/or tilt of the laser source 6 and detector 8, and may further control focus and/or a range finding apparatus on the laser source 6 and detector 8, for example, and may further execute program instructions for computing S, and H. The thickness H as a function of S depends on both a and b, and consequently a second equation relating a to b is required to isolate a and b.

Figure 5:
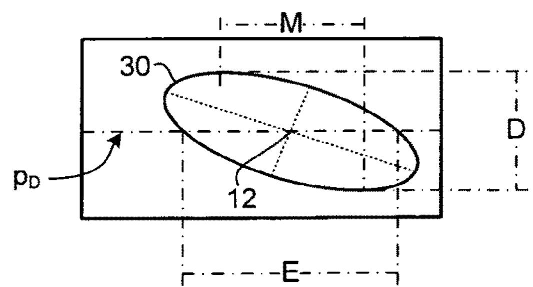
FIG. 5 is a schematic diagram illustrating measures of an image used in accordance with a first embodiment of the invention for determining angles needed to determine the thickness.

One expedient way of determining a and b is to project a cylindrical beam 30 onto the surface at the first spot 12, as shown in FIG. 5. The cylindrical beam 30 may be supplied by the same laser source 6 using a different optical path, by a different laser source, or by the same optical path having an adjusted parameter, for example, but in any case is directed onto the surface 4 from nominally the same direction as the beam 10. If two different laser sources are used to produce beam 10 and cylindrical beam 30, different colours may be chosen to enable image analysis of both beams simultaneously. For example, in lighting controlled environments where no filter is used at the detector 8, beam 10 could be red and cylindrical beam 30 could be green, permitting channel splitting of the image to derive red and green components of images for simultaneous analysis. Preferably the cylindrical beam 30 is of a diameter D great enough to facilitate fitting to a curve, but small enough that the surface 4 is substantially planar over its region. In some embodiments it will be preferred to used the cylindrical beam 30 to indicate a planarity of the surface 4 in the neighbourhood of the first spot 12 prior to measurement and detection, to avoid faulty measurements. In currently preferred embodiments, diameters D on the order of a few centimeters are preferred for spots of a fraction of a millimeter.

As shown in FIG. 5, the image formed at the detector 8 of the cylindrical beam 30 (diffusely reflected on the surface 4/layer 2/2') is skewed by differences in angles a and b, and also by a tilt angle T of the surface 4 with respect to $p_D$, so that the beam 30 is rendered as an ellipse. The effect of the tilt angle is discussed below. Using the same blob analysis software, the geometric properties of the ellipse are computed. The diameter D of the cylindrical beam 30 corresponds to an extent of the ellipse in the Y direction, as $p_D$ lies in the X direction. An extent of the ellipse in the X direction passing through a center of the ellipse (i.e. first spot 12), referred to herein as E, corresponds to a change of the diameter D caused by angles a and b, according to the following equation:

$$D/E = \frac{\sin(a)}{\sin(b)} \quad \text{(Eq. 1)}$$

Using Eq. 1, and measured values for A and B, a and b can be computed directly.

In some embodiments the tilt angle (T) can be neglected. Applicant has verified through a sensitivity analysis of the equations and expressions used to determine the thickness that a contribution of a tilt angle to the relationship between S and H is relatively small for certain applications. For tilt angles less than 45° where angular separations between the laser and camera are greater than 70°, ignoring tilt contributes less than 10 percent to error of the thickness measure. However, in some applications, this is not acceptable.

To determine the tilt T, an extent M of the ellipse in $p_D$ may be used as shown in FIG. 5, i.e. an X-axis (horizontal) separation between the top most point and lowest point of the ellipse. M and D, a and b are substituted into the following equation to determine T:

$$T = \tan^{-1}\left[\frac{M\sin(a)}{D\sin(a+b)}\right] \quad \text{(Eq. 2)}$$

Figure 6:
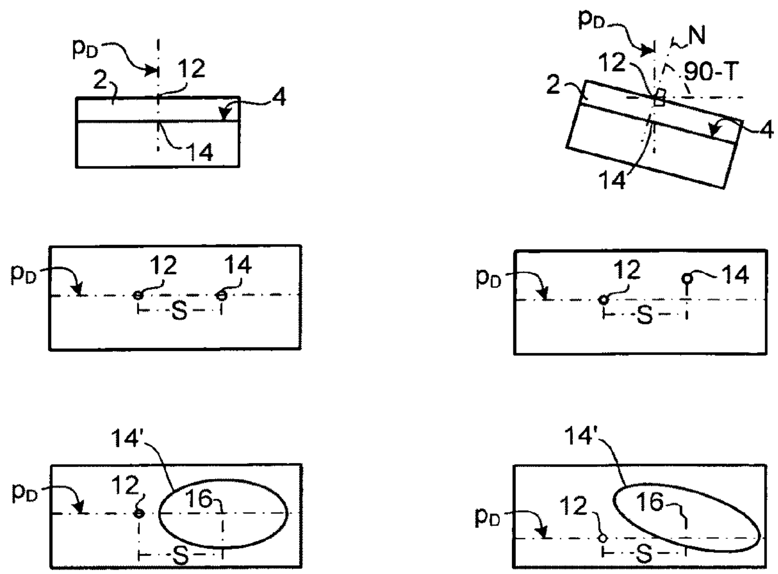
FIG. 6 is a schematic diagram illustrating measures of S in two different configurations of the invention.

With a, b and T defined, the thickness (H) of the layer 2/2' may be determined with the separation (S) of the centers of the first spot 12 and the illumination 14 projected onto a line in a detection plane $p_D$ (i.e. a plane including the laser source 6, first spot 12 and detector 8, see FIG. 6) as viewed at the detector according to the expression:

$$H = \frac{S}{\sin(b)\cos(RV)\tan(AV)\left[1 + \frac{\cos(RL)\tan(AL)}{\cos(RV)\tan(AV)}\right]} \quad \text{(Eq. 3)}$$

where: $RL=\tan^{-1}(\tan(a)\sin(T))$; $RV=\tan^{-1}(\tan(b)\sin(T))$; AL is the refraction angle of the beam 10 (i.e., $AL=\sin^{-1}(\sin(L)/n)$); and AV is the view angle of refraction (i.e., $AV=\sin^{-1}(\sin(V)/n)$).

Herein, n is the refractive index of the layer material. As illustrated above, V and L are the angles of incidence of the view line of the detector 8, and the beam 10, respectively. If the tilt angle is 0, the normal to the surface in the area of interest lies within $p_D$, and angles a and b are simply 90°−L and 90°−V, respectively. But in general a and b are defined in $p_D$ which may not be normal to the surface, but differ by tilt angle T; accordingly:

$$L = 90 - \tan^{-1}\left[\frac{\tan(a)\cos(T)}{\sqrt{1+(\tan(a)\sin(T))^2}}\right] \quad \text{(Eq. 4)}$$

-continued $$V = 90 - \tan^{-1}\left[\frac{\tan(b)\cos(T)}{\sqrt{1+(\tan(b)\sin(T))^2}}\right] \quad \text{(Eq. 5)}$$

FIG. 6 schematically illustrates how S may be computed in different configurations of the apparatus. In certain applications of the invention, prior to any measurement, the center of illumination 14'/second spot 14 will be in $p_D$. This can be accomplished by moving one of the laser source 6 or detector 8, for example. In these cases, (left hand column) separation of the first spot 12 and second spot 14 images is the distance between them, and is independent of an angle of rotation of the detector 8. As the embodiment of FIG. 4 shows the tilt axes of the laser source 6 and detector 8 being aligned, the first and second spots will be on the X line of the image, as shown. But it will be appreciated that if the tilt axes are not collinear, and the second spot 14 lies in the $p_D$, the distance between the first and second spots are still computed as a distance. The same applies for the center 16 of illumination 14' in lieu of the second spot 14.

If the apparatus is set up as per FIG. 4, and $p_D$ is not orthogonal to the surface 4 (i.e. an angle 90°−T is defined between a normal to the surface 4 and a normal to $p_D$) S is a separation of the two spots projected onto a line of $p_D$, which, in the illustrated embodiment, is the X axis of the image. Accordingly the separation of the two spots, or the first spot and the center 16 of illumination 14' is provided by a separation in the X axis, as illustrated.

Figure 7:
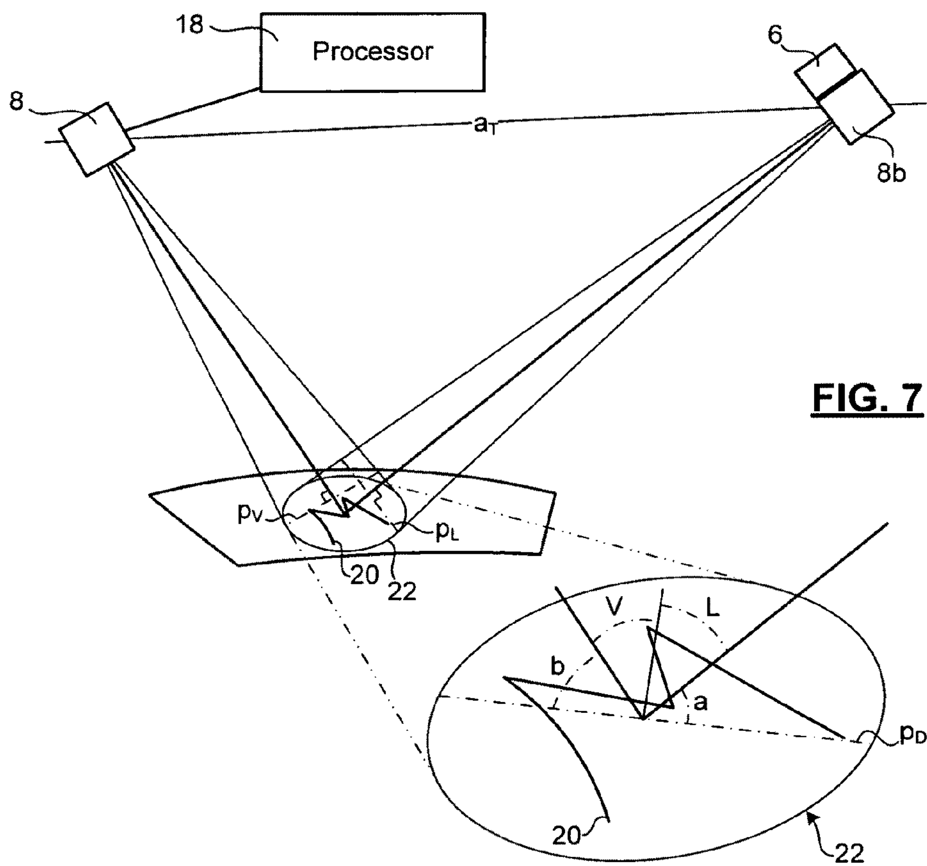
FIG. 7 is a schematic diagram illustrating an alternative system for deriving the angles needed to determine the thickness.

FIG. 7 shows an alternative mechanism for determining a and b that uses a feature 20 on the surface 4. As will be appreciated by those skilled in the art, in some embodiments naturally occurring or imposed features on the surface 4 or layer 2/2' can be used to provide a second equation relating angles a and b. According to this embodiment, a second detector **8*b* is provided near the laser source 6. As before A and B are defined with respect to a common tilt axis $a_T$. The angles a and b are also related by comparison of measurements of the feature 20 on the surface 4 that appears in the field of view of the detector 8 in the plane of the viewer ($p_V$) and laser ($p_L$). The surface 4** between the two points on the feature are assumed to be planar.

Separations of the points on the X axes of the image outputs of detector **8*b* and detector 8** are measured (SL and SV). The following equation can be used to compute a and b, along with the previously shown geometric equality (i.e. A+B=a+b):

$$\frac{SL}{SV} = \frac{\sin(a)}{\sin(b)} \quad \text{(Eq. 6)}$$

Alternative methods of configuration include using the laser to produce the linear feature 20. Similarly, the laser beam 10 could be moved across the field of view in the planes $p_L$ and $p_V$ of both telescopes, and the beginning and end points of the laser movement could be used in the same way as the end points of the linear feature in FIG. 7.

This technique was bench-top demonstrated using four types of layers: a clear layer of Plexiglas with a clear top surface (12 mm thickness), a Plexiglas layer with a diffusing top surface (12 mm), a layer of diffusive plastic (3 mm) and a highly diffusive layer of epoxy (4.5 mm) that had a multitude of tiny air bubbles in it. In the case of the clear Plexiglas thickness measurements were accurate to within a few percent, and for the three cases where diffusive layers were used, resulting in light blobs in the materials, the sensed layer thickness was accurate to within 20%. The laser incidence angle was 45 degrees and the view angle was normal to the layer surfaces. The distances were on the order of decimetres. The laser was a HeNe laser with a wavelength of 628 nm, and a power of less than 0.5 mW. The laser was focused on the surface with a spot size of 1 mm, and a digital still camera was used for the detector.

Figure 8:
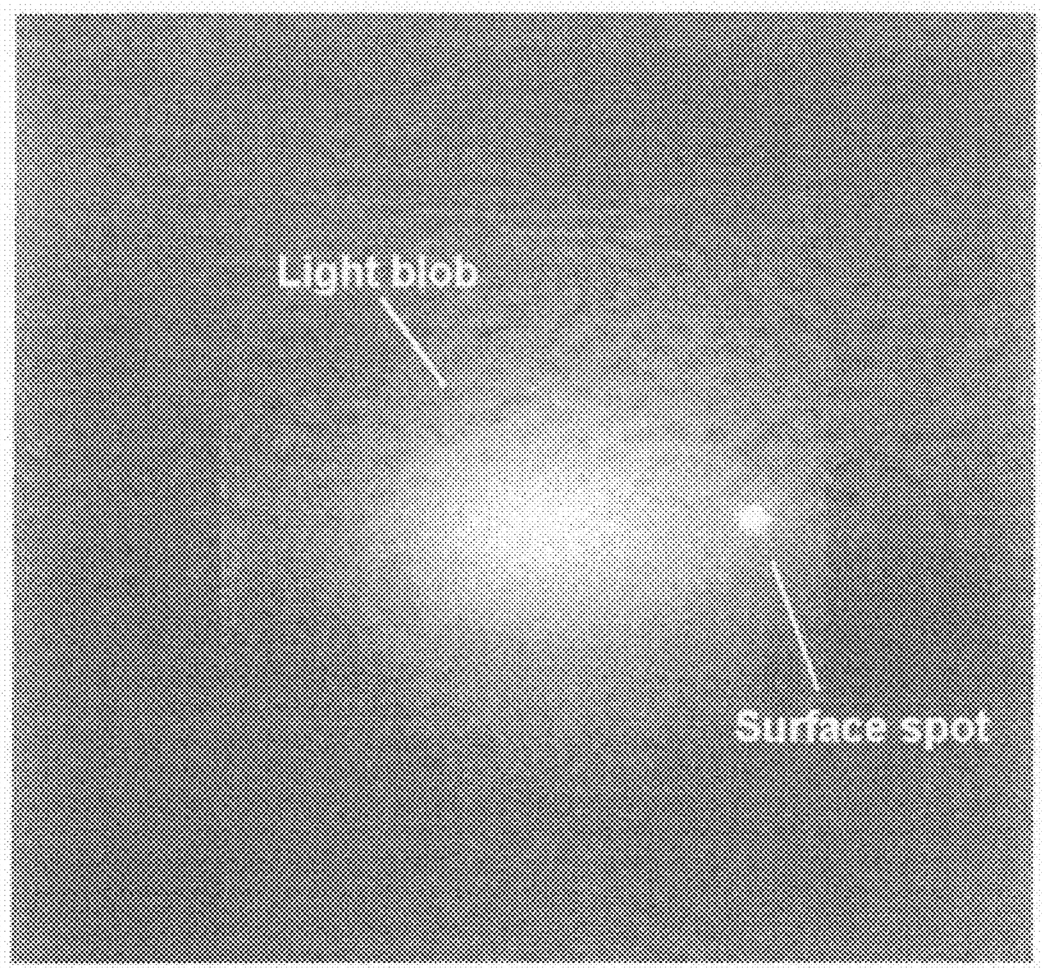
FIG. 8 is an exemplary image of the produced by the configuration of FIG. 3.

An example of digital image output from a diffuse plastic layer, showing an elliptical illumination and first spot at the layer top surface, is shown in FIG. 8. The image comes from the Plexiglas layer with the diffusive top surface.

It will be appreciated that applying this method outside of a laboratory setting with the surface at substantial distances from the laser source and the detector requires known equipment but applies the same principles as this demonstration.

Verification of this technique has further been made using an apparatus where the emitter of the beam is a helium neon laser having beam expander and focussing optics, and the detection equipment consisted of a telescope has been made. The layer used was a cloudy ice formed with frozen, wetted snow, and was 3.3 mm thick. The laser was 44 feet from the sample, and the telescope and camera were 48 feet from the sample. The beam angle of incidence to the layer was 10 degrees, and the line of view of the telescope and camera were 35 degrees to the normal of the surface. The normal of the surface lay in the plane of detection. The detection accuracy in this case was greater than 90%.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A method for optical measurement of a thickness of a layer on a surface, the method comprising:

a. sending a focused beam of light onto a spot on the layer whereby a substantial part of the beam is refracted for transmission through the layer to illuminate a region on the surface;

b. detecting diffuse reflections from the spot and the region on the surface using detecting equipment;

c. determine a separation between centers of the detected spot and the region; and d. using the separation between the centers, and geometric properties of the beam, the surface, and the detecting equipment, and an index of refraction of the layer to compute a thickness of the layer.

2. The method according to claim 1 wherein sending the focused beam of light comprises projecting a laser beam at a distance from the surface.

3. The method according to claim 2 wherein projecting the laser beam comprises using beam expander and focusing optics to project the laser beam of a desired diameter on the surface.

4. The method according to claim 1 wherein detecting diffuse reflections comprises capturing a digital image of the spot and the region.

5. The method according to claim 4 wherein capturing the digital image comprises operating a digital camera with a telephoto lens positioned a distance from the surface.

6. The method according to claim 4 wherein capturing the digital image comprises controlling an imaging system including a diode array.

7. The method according to claim 4 further comprising presenting the digital image to a data processor.

8. The method according to claim 7 wherein determining the separation between centers of the detected spot and the region comprises applying a blob analysis program to the digital image by the data processor to identify a center of both the spot and the region, and to compute the separation.

9. The method according to claim 4 wherein determining the separation between centers of the detected spot and the region comprises computing a separation of the centers projected onto a line on the digital image that lies on a plane of detection defined by a line of view of the detection equipment and the beam.

10. The method according to claim 9 wherein computing the thickness of the layer comprises applying the following equation, or a simplification thereof:

$$H=S/(\sin(b)[\cos\{\tan-1(\tan(b)\sin(T))\}\tan\{\sin-1(\sin(V)/n)\}+\cos\{\tan-1(\tan(a)\sin(T))\}\tan\{\sin-1(\sin(L)/n)\}])$$

in which: V is an angle between a line of view of the detector and a normal to the surface; L is an angle of incidence of the beam; a is an angle in the plane of detection between the beam and the surface; b is an angle in the plane of detection between the line of view and the surface; and T is a tilt angle defined as ninety degrees minus an angle between the normal to the surface and a normal to the plane of detection.

11. The method according to claim 1 further comprising spatially configuring the beam, and detection equipment with respect to the spot on the surface, and determining the geometric properties of the beam, the surface, and the detecting equipment in the configuration.

12. The method according to claim 11 wherein spatially configuring the beam, and detection equipment with respect to the spot on the surface comprises aligning a tilt axis of a laser source for emitting the beam, with a tilt axis of detection equipment.

13. An apparatus for optical measurement of a thickness of a layer on a surface, the apparatus comprising:

a. an emitter of a focused beam of light arranged to project the focused beam onto a spot on the layer such that a substantial part of the beam is refracted for transmission through the layer to illuminate a region on the surface;

b. detection equipment configured with a line of view oriented so that diffuse reflections of the spot and region are in a field of view of the detection equipment; and c. a data processor for computing a separation between centers of the detected spot and the region sensed by the detection equipment, and for computing a thickness of the layer using the separation, an index of refraction of the layer, and geometric properties of the beam, the surface, and the line of view.

14. The apparatus according to claim 13 wherein the emitter comprises a laser.

15. The apparatus according to claim 13 wherein the emitter comprises a laser, a beam expander, and focusing optics for focusing the beam so that at the surface the beam is of a desired diameter.

16. The apparatus according to claim 13 wherein detection equipment comprises a digital camera.

17. The apparatus according to claim 13 wherein detection equipment comprises a diode array.

18. The apparatus according to claim 13 wherein detection equipment comprises a telephoto lens provide imaging of the diffuse reflections of the spot and the region from a distance.

19. The apparatus according to claim 13 wherein the data processor is a general purpose computer.

20. The apparatus according to claim 13 wherein the data processor is adapted to execute a blob analysis program for computing the centers of the detected spot and the region on the surface.

21. The apparatus according to claim 13 wherein the emitter and detection equipment are mounted on pan and tilt platforms.

22. The apparatus according to claim 21 wherein the pan and tilt platforms are motorized for fine motion control.

23. The apparatus according to claim 21 wherein the tilt platforms are aligned so that tilt axes of the platforms are collinear.

24. A kit for measuring a thickness of a layer on a surface, the kit comprising: instructions for configuring a laser source and detector equipment with respect to the surface, so that an emitter of a focused beam of light is arranged to project the focused beam onto a spot on the layer such that a substantial part of the beam is refracted for transmission through the layer to illuminate a region on the surface, and the detection equipment is configured with a line of view oriented so that diffuse reflections of the spot and region are in a field of view of the detection equipment; and program instructions for a processor for computing a thickness of the layer using a separation of a center of detected spot and a center of the region when the laser source and detector equipment are configured with respect to a surface as described above, an index of refraction of the layer, and geometric properties of the beam, the surface, and the line of view.

25. The kit according to claim 24 further comprising program instructions for a processor for computing the centers of the detected spot and the region to determine a separation between the centers from a digital image of the diffuse reflections of the spot and the region.

26. The kit according to claim 24 further comprising the detector equipment.

27. The kit according to claim 24 further comprising the laser source.

28. The method according to claim 4 wherein the tilt angle is less than a maximum angle and angular separations between the laser and detector are maintained above a minimum angle, and the tilt angle is neglected in computing the thickness of the layer.

* * * * *